(12) United States Patent
Inoue

(10) Patent No.: US 6,824,742 B1
(45) Date of Patent: Nov. 30, 2004

(54) AUTOMATED CHEMICAL SYNTHESIZER

(75) Inventor: Takaaki Inoue, Moriyama (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 09/492,452

(22) Filed: Jan. 27, 2000

(30) Foreign Application Priority Data

Feb. 4, 1999 (JP) .......................................... 11-027322

(51) Int. Cl.$^7$ .......................... G05B 17/00; B32B 27/04
(52) U.S. Cl. ....................... 422/116; 422/131; 422/236; 422/62; 422/100; 422/110
(58) Field of Search .............................. 422/131, 236, 422/62, 100, 110, 116; 700/266, 268, 269

(56) References Cited

U.S. PATENT DOCUMENTS 4,746,490 A * 5/1988 Saneii ........................ 422/62
5,282,149 A * 1/1994 Grandone et al. ............ 702/19
5,503,805 A * 4/1996 Sugarman et al. .......... 422/131

* cited by examiner

Primary Examiner—Glenn Caldarola
Assistant Examiner—Alexis Wachtel
(74) Attorney, Agent, or Firm—Oblon, Spivak, McClelland, Maier & Neustadt, P.C.

(57) ABSTRACT

An automated chemical synthesizer including a plurality of reaction vessels and an execution time calculator. Synthetic reactions are to be carried out in the plurality of reaction vessels according to a synthesizing process. The execution time calculator is configured to calculate presumed execution time to carry out a predetermined scope of the synthesizing process before the predetermined scope of the synthesizing process is actually carried out.

17 Claims, 9 Drawing Sheets

FIG. 5

| Line Number | Process | Contents |
|---|---|---|
| 1 | Dispensing | Dispensing △△△, ○○○ |
| 2 | Stirring | |
| 3 | Reaction | First Reaction of × × × |
| 4 | Discharging | |
| ... | ... | ... |
| n-1 | Dispensing | Dispensing Extracting Liquid |
| n | Collecting | Collecting Chemical Compounds |

AUTOMATED CHEMICAL SYNTHESIZER

CROSS-REFERENCE TO RELATED APPLICATIONS

The present application claims priority under 35 U.S.C. §119 to Japanese Patent Application No. 11-27,322, filed Feb. 4, 1999, entitled "Automated Synthesizing Apparatus." The contents of that application are incorporated herein by reference in their entirety.

BACKGROUND OF THE INVENTION

1. Field of the Invention

The present invention relates to an automated chemical synthesizer.

2. Description of the Background

Automated chemical synthesizers have been used for research in the fields of pharmaceutical, life science, chemistry and material science among others.

FIG. 9 shows a conventional automated chemical synthesizer. Referring to FIG. 9, the automated chemical synthesizer has a syringe 53 and a reaction block 51 which includes multiple reaction vessels 52 in which synthetic reactions take place. The syringe 53 dispenses solvents and reagents to each reaction vessel 52 according to preset protocols. In the automated chemical synthesizer, synthetic reactions in the reaction vessels 52 take place concurrently. Therefore, the automated chemical synthesizer synthesizes multiple experimental chemical compounds simultaneously. Then, compounds synthesized in the reaction vessels 52 are collected respectively.

In the automated chemical synthesizer, an operator designs a synthesizing protocol and installs it in the automated chemical synthesizer. Then, when the operator commands to start the synthesizing process, the automated chemical synthesizer automatically synthesizes compounds according to the synthesizing protocol.

In this automated chemical synthesizer, an operator estimates the execution time to carry out the synthesizing process based on his experience and intuition.

However, generally, the synthesizing protocol is complicated because the synthesizing process includes a plurality of reactions, and because reagents and solvents are dispensed to a large number of reaction vessels 52 in each process while the reactions and reagents are changed.

Further, the execution time depends on the characteristics of the synthesizer, because the synthesizer controls the synthesizing process. Accordingly, there are many uncertainties to predict the execution time. Therefore, it is difficult to precisely predict the execution time and thereby causing the following inconveniences.

For example, although an operator starts the synthesizing process to be complete in the daytime based on his predicted execution time, the synthesizing process may be complete in the nighttime. Accordingly, since the synthesizer does not start the next synthesizing process until an operator commands to start, the synthesizer remains to stop. Therefore, the synthesizer may not be efficiently utilized.

Further, in order to observe a certain important reaction of the synthesizing process, the observer may wait for the important reaction until it starts or may miss a chance to observe it.

SUMMARY OF THE INVENTION

According to one aspect of the invention, an automated chemical synthesizer includes a plurality of reaction vessels and an execution time calculator. Synthetic reactions are to be carried out in the plurality of reaction vessels according to a synthesizing process. The execution time calculator is configured to calculate presumed execution time to carry out a predetermined scope of the synthesizing process before the predetermined scope of the synthesizing process is actually carried out.

According to another aspect of the invention, an automated chemical synthesizer includes a plurality of reaction vessels and an execution time calculator. Synthetic reactions are to be carried out in the plurality of reaction vessels according to a synthesizing process. The execution time calculating means calculate presumed execution time to carry out a predetermined scope of the synthesizing process before the predetermined scope of the synthesizing process is actually carried out.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which:

FIG. 5 illustrates a synthesizing process picture which shows each process of the synthesizing process in an execution order;

DETAILED DESCRIPTION OF THE PREFERRED EMBODIMENTS

Figure 1:
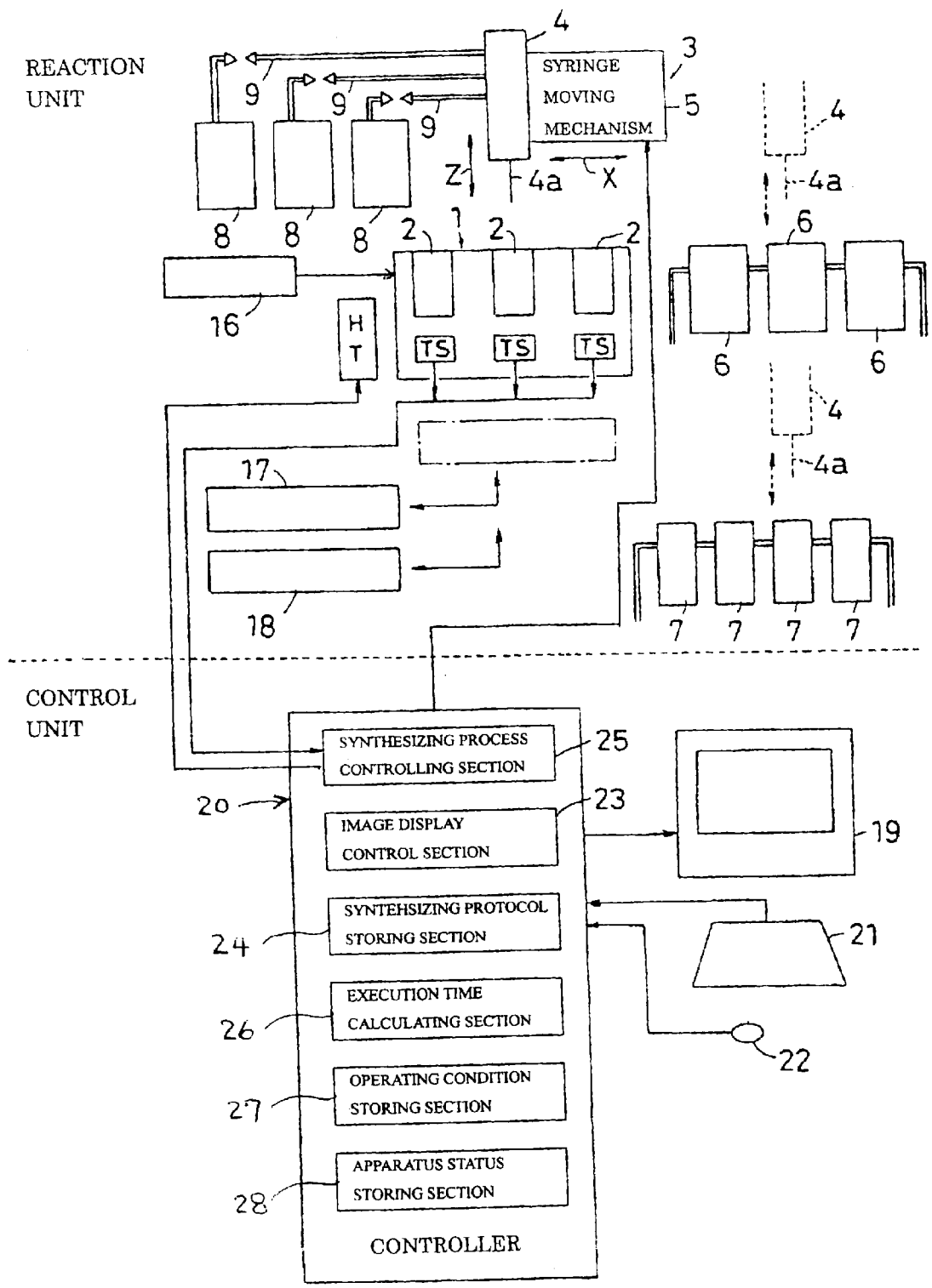
FIG. 1 is a block diagram showing an automated chemical synthesizer for synthesizing organic compounds according to an embodiment of the present invention.

The preferred embodiments will now be described with reference to the accompanying drawings, wherein like reference numerals designate corresponding or identical elements throughout the various drawings.

Figure 2:
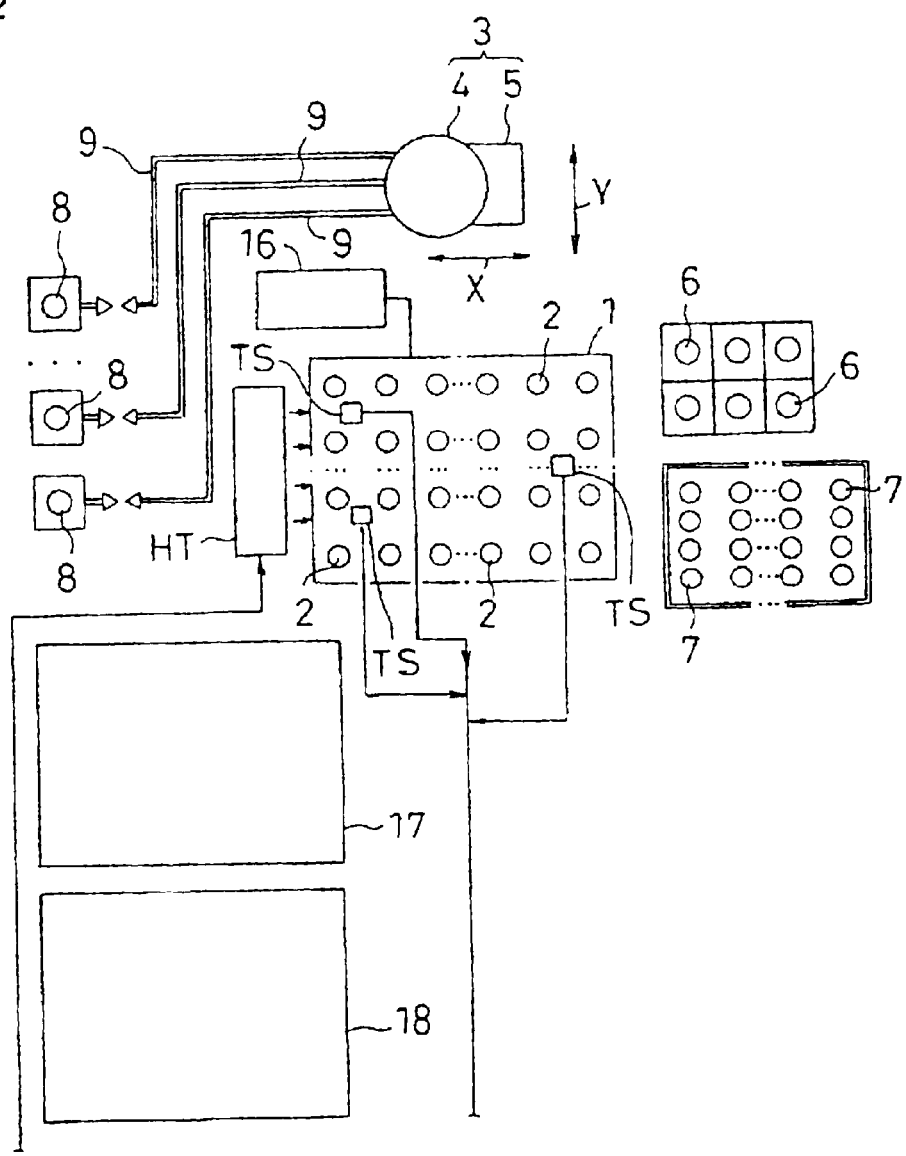
FIG. 2 is a schematic top plan view of a reaction unit of the automated chemical synthesizer shown in FIG. 1.

FIG. 1 shows an automated chemical synthesizer for synthesizing organic compounds according to an embodiment of the present invention. Referring to FIG. 1, the automated chemical synthesizer includes a reaction unit and a control unit. In the reaction unit, synthetic reactions take place. The control unit controls the operations in the reaction unit. The reaction unit of the automated chemical synthesizer includes a reaction block 1 and a liquid dispenser 3. The reaction block 1 includes a number of reaction vessels 2 in which synthetic reactions take place. The liquid dispenser 3 dispenses liquid chemicals, i.e., reagents and solvents to the reaction vessels 2 according to preset dispensing procedures in synthesizing protocol. As shown in FIG. 2, the reaction vessels 2 are arranged in a column and row matrix in the reaction block 1. The number of reaction vessels 2 provided in the reaction block 1 need not be specific but may be set, for example, around from ten to several hundreds such as 96, 384 or the like.

Referring to FIGS. 1 and 2, the liquid dispenser 3 includes a syringe 4 and a syringe moving mechanism 5 which moves the syringe 4 right and left along an (X) direction, back and forward along a (Y) direction, and up and down along a (Z) direction according to the preset dispensing protocol. The syringe moving mechanism 5 moves the syringe 4 according to commands received from the control unit.

Large reagent vials 6 which contain large use amount reagents and small reagent vials 7 which contain small use amount reagents are provided next to the reaction block 1. Both large and small reagent vials (6 and 7) are provided as many as needed. Also, gallon bins 8 which contain solvents are provided next to the reaction block 1. The gallon bins 8 are connected to the syringe 4 by tube lines 9, respectively.

As shown by dotted lines in FIG. 1, to dispense the reagents to the reaction vessels 2, the syringe 4 moves to the designated location in the vicinity of the large or small reagent vial (6 or 7) which contains reagent to be dispensed. Next, the syringe 4 draws reagent from the designated reagent vial through a needle (4a) provided to the syringe 4. Then, the syringe 4 moves to a designated reaction vessel 2 and dispenses the drawn reagent through the needle (4a) to the designated reaction vessel 2.

To dispense the solvents to the reaction vessels 2, a designated solvent is supplied to the syringe 4 through the tube line 9. After the syringe 4 moves to the designated reaction vessel 2, the solvent supplied to the syringe 4 is dispensed to the designated reaction vessel 2 through the needle (4a).

Figure 3:
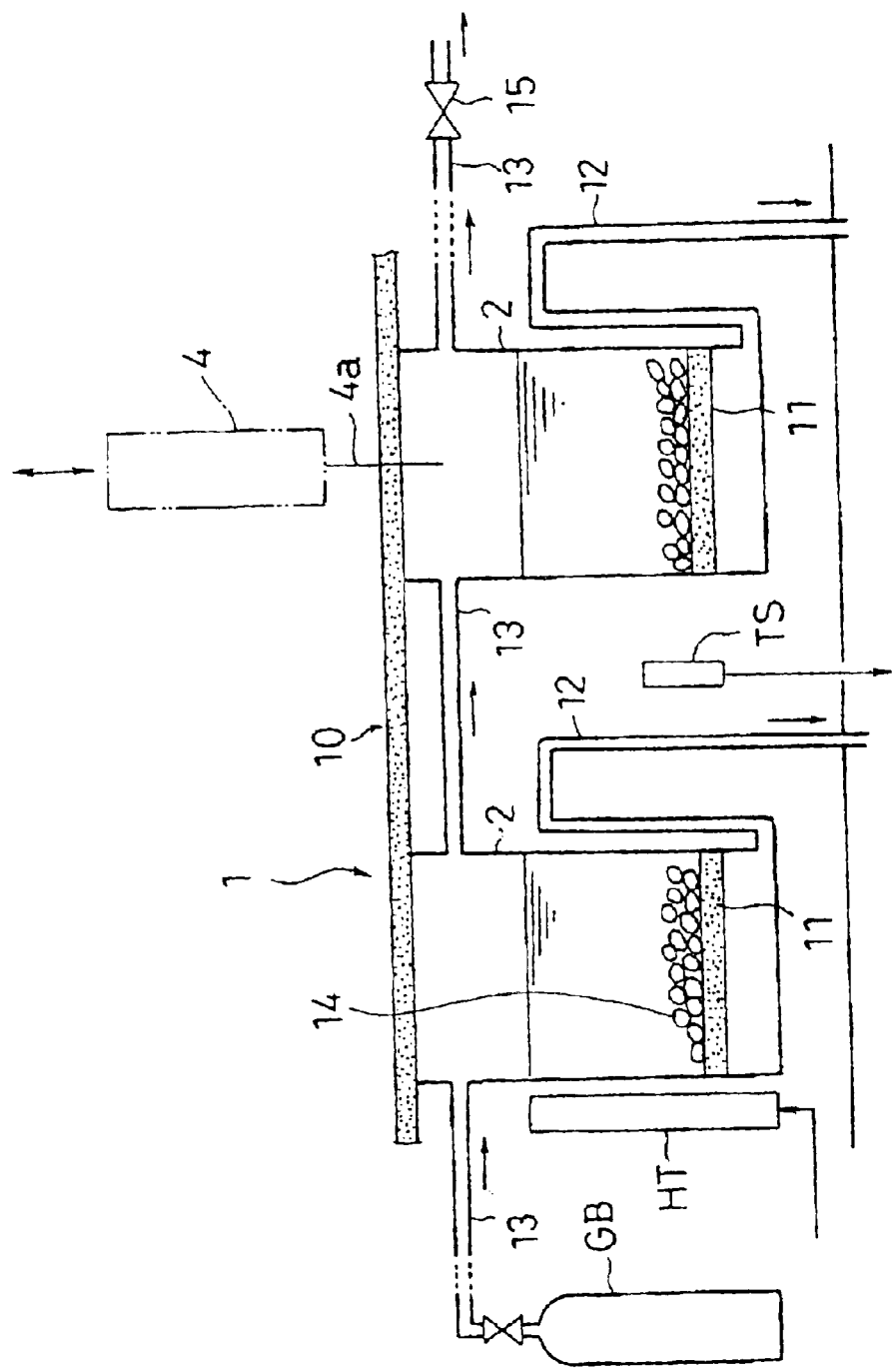
FIG. 3 is a schematic side view of main components in a reaction rack of the automated chemical synthesizer shown in FIG. 1.

Referring to FIG. 3, the reaction block 1 of the embodiment includes a common septum 10, filters 11, drainage tubes 12 and a gas line 13. The common septum 10 is in a sheet form and covers dispensing openings of the reaction vessels 2. The filter 11 is provided in each reaction vessel 2 to close the bottom opening of the reaction vessel 2. A liquid passes through the filter 11 when the liquid is pressurized. Each drainage tube 12 is connected to the bottom of each reaction vessel 2. A gas tank (GB) is connected to the reaction vessels 2 via a gas line 13 in the vicinity of the dispensing openings of the reaction vessels 2. Accordingly, a pressurized gas such as a compressed inert gas can be introduced into the reaction vessels 2 from the gas tank (GB) through the gas line 13. In order to dispense the reagent or the solvent to the reaction vessel 2, the needle (4a) pierces through the common septum 10 to proceed to the inside of the reaction vessel 2. An appropriate amount of resin granules 14 is deposited inside each reaction vessel 2 for solid phase reactions. A valve 15 is provided near the end of the gas line 13. The valve 15 is closed when a pressurized gas is introduced into the reaction vessels 2.

Referring to FIG. 1, the reaction unit includes a vibrator 16, a discharging tray 17 and a collecting block 18. After the dispensing process, the vibrator 16 vibrates the reaction block 1 to vibrate the resin granules 14 in each reaction vessel 2'. Waste materials produced in each reaction vessel 2 as a result of the chemical reactions are discharged to the discharging tray 17. A chemical compound produced in each reaction vessel 2 as a result of the chemical reactions is collected by the collecting block 18. Both the discharging tray 17 and the collecting block 18 are arranged to move between a waiting position and a position underneath the reaction block 1.

The reaction block 1 includes three temperature sensors (TS) and an electric heater (HT) which heats the reaction block 1. The number of the temperature sensors (TS) is not limited to three. The temperature sensors (TS) are arranged in the reaction block 1 to detect temperatures representing the actual temperatures of the reaction vessels 2. The control unit controls the electric heater (HT) to maintain the temperatures of the reaction vessels 2 at the target temperatures. In the synthesizing process, the reagents and solvents are dispensed to the reaction vessels 2 and solid phase reactions take place inside the resin granules 14, and desired compounds are thereby produced. The synthesizing process includes a dispensing process, a stirring process, a reaction process, a discharging process, and a collecting process. In the dispensing process, the liquid dispenser 3 dispenses the reagents and solvents to the reaction vessels 2. In the reaction process, solid phase reactions take place inside the resin granules 14. In the discharging process, the pressurized gas in the gas tank (GB) is introduced into each reaction vessel 2 through the gas line 13, so that the reagents and the solvents in the reaction vessel 2 pass through the filter 11 and flow into the discharging tray 17 via the drainage tube 12.

After the final reaction is complete, in a dispensing process, an extraction liquid, usually an acid solvent, is supplied to each reaction vessel 2 through the dispensing opening in order to extract the desired compounds from the resin granules 14. Following the extraction of the desired compounds, in a collecting process for collecting the compounds, the pressurized gas in the gas tank (GB) is introduced into each reaction vessel 2 through the gas line 13, so that the desired compounds together with the extraction liquid pass through the filter 11 and flow into the collecting block 18 via the drainage tube 12.

Referring to FIGS. 1, 4, 5 and 6, the control unit in the embodiment will be explained. Referring to FIG. 1, the control unit of the automated chemical synthesizer of the embodiment includes a monitor 19, a controller 20, a keyboard 21, and a mouse (or a pointing device) 22. The monitor 19 displays protocol setting pictures necessary for the operation of the automated chemical synthesizer. The controller 20 controls the operation of the automated chemical synthesizer.

The controller 20 includes an image display control 10, section 23, a synthesizing protocol storing section 24, a synthesizing process controlling section 25, an execution time calculating section 26, an operating condition storing section 27, and an apparatus status storing section 28. The image display control section 23 controls the monitor 19 to display the protocol setting pictures. The synthesizing protocol storing section 24 stores the synthesizing protocol. The synthesizing process controlling section 25 sends command signals to the reaction unit to control the synthesizing process according to the synthesizing protocol stored in the synthesizing protocol storing section 24. The execution time calculating section 26 calculates a presumed execution time to execute a predetermined scope of the synthesizing process, i.e., a part or an entirety of the synthesizing process which is supposed to be executed. The operating condition storing section 27 stores the operating conditions of the synthesizer. The apparatus status storing section 28 stores the status of the synthesizer.

In the embodiment, the synthesizing protocol is set according to the protocol setting pictures displayed in the monitor 19 by using the keyboard 21 and the mouse 22. Then the synthesizing protocol storing section 24 stores the synthesizing protocol. The synthesizing protocol includes each process, the order of each process and the like in order to carry out the synthesizing process.

Figure 4:
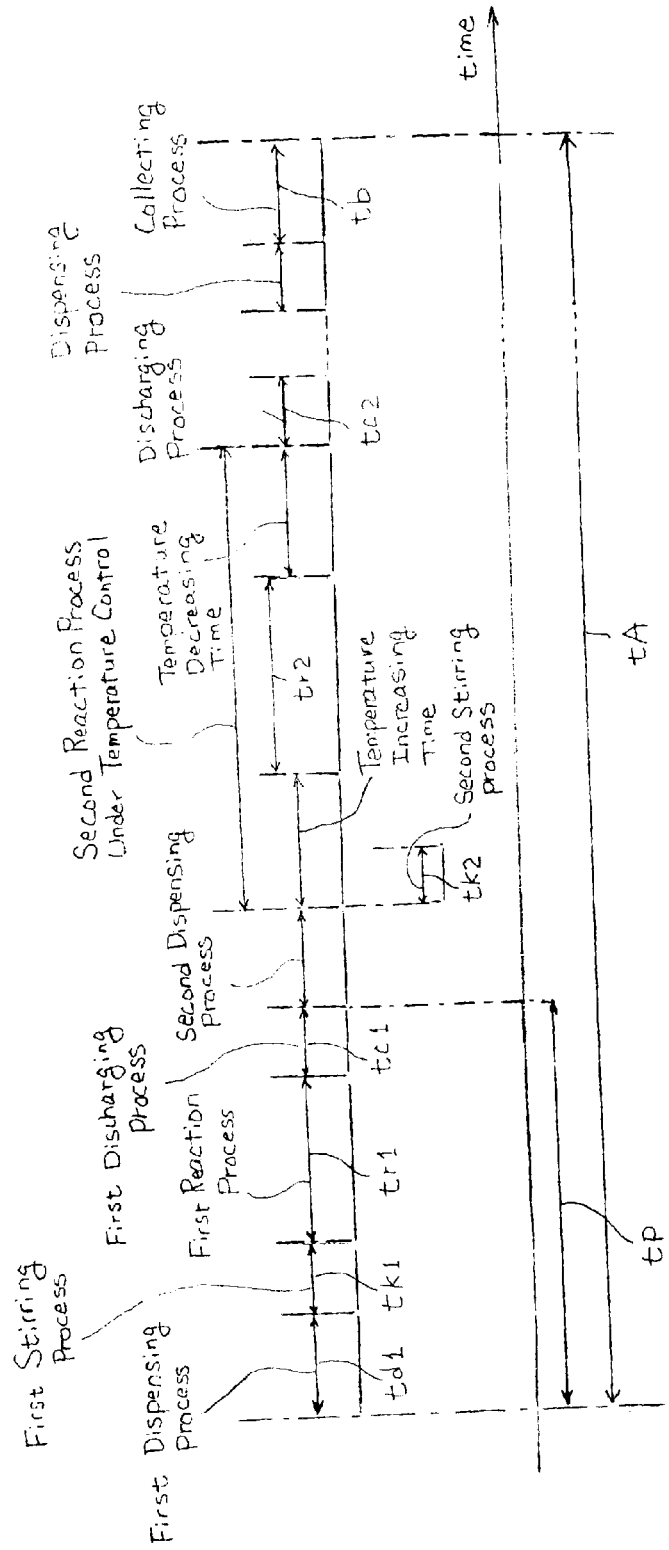
FIG. 4 is a time chart of a synthesizing process.

Referring to FIG. 4, the synthesizing process includes a plurality of reaction cycles. Each reaction cycle includes a dispensing process, a stirring process, a reaction process, and a discharging process. After the final reaction cycle, a dispensing process and a collecting process are carried out. For example, each process is carried out according to the following order.

(1) the first dispensing process, (2) the first stirring process, (3) the first reaction process, (4) the first discharging process, (5) the second dispensing process, (6) the second stirring process, (7) the second reaction process while the reaction block temperature is controlled, (8) the discharging process, . . . (n−1) the dispensing process, and (n) the collecting process.

In the dispensing process performed immediately before the collecting process, the extraction liquid is dispensed to the reaction vessels 2 in order to extract the desired compounds from the resin granules 14. The container which contains the extraction liquid is placed at a predetermined position. The syringe 4 draws the extraction liquid from the extraction liquid container and dispenses the extraction liquid to the reaction vessels 2.

A dispensing process is carried out according to a dispensing procedure which includes information with respect to the kind and amount of reagents and solvents to be dispensed and reaction vessels to which the reagents and solvents are dispensed. For example, in one dispensing process, the liquid dispenser 3 dispenses a small use amount reagent of 1 cc to each of all reaction vessels 2, and the liquid dispenser 3 further dispenses a solvent of 2 cc to each of all reaction vessels 2. Since position addresses are assigned to the reaction vessels 2, respectively, the liquid dispenser may dispense the reagents and solvents to specified reaction vessels 2 or a part of all reaction vessels 2.

Also, position addresses are assigned to the large and small reagent vials (6 and 7) and gallon bins 8, respectively. An operator inputs information with respect to position addresses of reagents or solvents according to the protocol setting pictures which are displayed in the monitor 19. The operating condition storing section 27 stores this information. In the dispensing process, based on this information, the controller 20 finds the position of the reagent vial (6 or 7) which contains reagents to be dispensed and moves the syringe 4 to the position to draw the reagent from the reagent vial (6 or 7), or the controller 20 finds the position of the gallon bin 8 which contains solvents to be dispensed and supplies the solvent to the syringe 4 through the tube line 9.

The reaction procedure includes a reaction time during which synthetic reaction takes place. Further, the reaction procedure includes a target temperature at which the controller 20 controls the temperature of the reaction block 1 while the synthetic reaction takes place.

When the synthetic reaction takes place while the controller 20 controls the temperature of the reaction block 1, the synthesizing process controlling section 25 controls the electric heater (TS) such that the temperature difference between the detected temperature detected by the temperature sensor (TS) and the target temperature becomes zero. Accordingly, the temperature of the reaction block 1 increases from a room temperature to the target temperature and is maintained at the target temperature. The reaction process is carried out for a predetermined reaction time while the reaction temperature is controlled. When the reaction process is complete, the synthesizing process controlling section 25 turns off the electric heater 25. After the reaction block temperature cools down to the room temperature, the next process will be carried out.

In a stirring process, the vibrator 16 vibrates the reaction block 1 to vibrate the resin granules 14 in each reaction vessel 2 for a stirring time. A stirring procedure of the stirring process includes the stirring time during which the vibrator 16 vibrates the reaction block 1.

A discharging procedure of the discharging process includes the discharging time during which the discharging process is carried out. A collecting procedure of the collecting process includes the collecting time during which the collecting process is carried out. In the discharging and collecting processes, the pressurized gas is supplied to the reaction vessels 2 through the gas line 13 for the discharging time or the collecting time in order to discharge the reagents and the solvents from the reaction vessels 2 or to collect the chemical compounds synthesized in the reaction vessels 2.

When the synthesizing process is carried out according to the synthesizing protocol, the synthesizing process controlling section 25 sends signals according to operating conditions to carry out the synthesizing process automatically.

The operating condition storing section 27 stores the kinds of reagents and solvents corresponding to the positions of the containers (6, 7 and 8) which contain reagents or solvents, a drawing speed at which the syringe 4 draws reagent, a supplying speed at which solvent is supplied to the syringe 4, and an injecting speed at which the syringe injects reagent or solvent into the reaction vessel 2.

If the drawing, supplying and injecting speeds are inappropriate, bubbles may be generated in the reagent or the solvent when the reagent or the solvent is drawn, supplied or injected. Accordingly, the drawing, supplying and injecting speeds are determined according to the kinds of reagents or solvents not to generate bubbles. The drawing, supplying and injecting speeds are set according to the protocol setting pictures which are displayed in the monitor 19. The drawing, supplying and injecting speeds are adjusted by adjusting the operational speed of the syringe 4.

The apparatus status storing section 28 stores information which includes distance information, temperature increasing time information, and temperature reducing time information. The distance information relates to, for example, distances among the syringe 4, the reagent vials (6 and 7), the gallon bins 8, the extraction liquid container, and the reaction vessels 2. The distance information includes all distances among the positions to which the syringe 4 may move. The temperature increasing time information relates to, for example, a time during which the heater (HT) heats the reaction block 1 from a room temperature to a target temperature. The temperature reducing time information relates to, for example, a time during which the reaction block 1 is cooled down to a room temperature. Since the target temperature varies depending on the kinds of chemical reactions, the apparatus status storing section 28 stores as a map the relationship between the target temperature and the temperature increasing and temperature reducing times. In the c map, the target temperature varies, for example, from a room Temperature (for example 25° C.) to a maximum target temperature (for example 120° C.) by 1° C. Data which the apparatus status storing section 28 stores are predetermined by experimentations and the like.

The execution time calculating section 26 calculates execution time to execute each process.

The execution time of the dispensing process is calculated as described below. Before the syringe 4 dispenses the liquid chemicals, the syringe 4 is in a waiting position. It is supposed that the syringe 4 moves at the same speed in each of X, Y, and Z directions. For example, when the syringe 4 dispenses a designated large use amount reagent to a reaction vessel 2, the syringe 4 moves as follows:

(A1) the syringe 4 moves from the waiting position to a position above the large reagent vial 6 which contains the designated reagent;

(A2) the syringe 4 descends by a predetermined descent distance in the Z direction;

(A3) the syringe 4 draws the reagent from the large reagent vial 6;

(A4) the syringe 4 ascends by a predetermined ascent distance in the Z direction;

(A5) the syringe 4 moves to a position above the reaction vessel 2 to which the reagent is to be dispensed;

(A6) the syringe 4 descends by a predetermined descent distance in the Z direction;

(A7) the syringe 4 injects the reagent to the reaction vessel 2;

(A8) the syringe 4 ascends by a predetermined ascent distance in the Z direction; and (A9) the syringe 4 moves to the waiting position.

The position of the large reagent vial 6 is found based on the information which is stored in the operating condition storing section 27. The apparatus status storing section 28 stores the distance between the waiting position of the syringe 4 and the position of the large reagent vial 6. Accordingly, the time during which the syringe 4 moves from the waiting position to the position above the large reagent vial 6 which contains the designated reagent, i.e., the time to carry out the step (A1) is calculated based on the distance and the moving speed of the syringe 4. Similarly, the times to carry out the steps (A5) and (A9) are calculated. The times to carry out the steps (A2), (A4), (A6) and (A8) are calculated based on the predetermined descent and ascent distances and the moving speed of the syringe 4.

Alternatively, each moving time during which the syringe 4 moves to each position in the synthesizing process may be actually measured and stored in the apparatus status storing section 28. Accordingly, the times to carry out the steps (A1), (A2), (A4), (A5), (A6) and (A8) are easily found.

The time to carry out the step (A3) is calculated based on an amount of reagent to be drawn and a reagent drawing speed, i.e., an amount of reagent which the syringe 4 draws during a unit time. The amount of reagent to be drawn is equal to the amount of reagent to be dispensed. The time to carry out the step (A7) is calculated based on an amount of reagent to be injected and a reagent injecting speed, i.e., an amount of reagent which the syringe 4 injects during a unit time. The amount of reagent to be drawn is equal to the amount of reagent to be dispensed. As described above, the execution time to execute the dispensing process is calculated.

When the syringe 4 dispenses a designated large use amount reagent to a plurality of reaction vessels 2, the syringe 4 draws the reagent to dispense to one designated reaction vessel 2 and injects the drawn reagent to the one designated reaction vessel 2. This operation is repeated to dispense the other reaction vessels 2. Alternatively, the syringe 4 may draw reagent to dispense to a plurality of designated reaction vessels 2 at one time and inject a part of the drawn reagent to each of the plurality of designated reaction vessel 2. When the total dispensing amount of the reagent to be dispensed to the plurality of designated reaction vessels 2 is larger than the maximum drawn amount of the syringe 4, for example, 10 cc, the operation described above is repeated. In this case, the execution time to execute the dispensing process is calculated in a way similar to that described above.

When the syringe 4 dispenses a designated small use amount reagent to a reaction vessel 2, the execution time to execute the dispensing process is calculated in a way similar to that of the large use amount reagent.

When the syringe 4 dispenses a designated solvent, the operation is substantially similar to that of dispensing reagents except that the solvent is supplied to the syringe 4 through the tube line 9 instead of drawing reagent.

The time for supplying solvent to the syringe 4 through the tube line 9 is calculated based on an amount of solvent which is supplied to the syringe 4 and a supplying speed of solvent, i.e., an amount of solvent which is supplied to the syringe 4 during a unit time. The operating condition storing section 27 stores the amount of solvent which is supplied to the syringe 4 and the supplying speed of solvent. Accordingly, the execution time to dispense solvents is calculated. When the dispenser 3 dispenses a plurality of reagents or solvents, the execution time to execute the dispensing process is calculated in a similar way according to the operation of the syringe 4.

When the chemical synthesizer includes a plurality of liquid dispensers 3, the execution time to execute the dispensing process is calculated by excluding the overlapped dispensing time, i.e., the time during which the plurality of liquid dispenser 3 dispenses simultaneously.

When the syringe 4 dispenses different reagents or solvents, the syringe 4 is washed in order to prevent mixing of the different reagents or solvents. In washing the syringe, before the next dispensation process starts, reagent or solvent to be dispensed in the next dispensation is drawn or supplied to the syringe 4 and discharged to the discharging tray 17 after washing the syringe 4.

The execution times to execute the reaction process and the stirring process are calculated based on the reaction time and vibrating time.

When the reaction takes place under temperature control condition, the execution time to execute the reaction process includes reaction time, temperature increasing time, and temperature decreasing time. During the temperature increasing time, the temperature of the reaction block 1 increases from around the room temperature to a target temperature. During the temperature decreasing time, the temperature of the reaction block 1 decreases from the target temperature to around the room temperature. The apparatus status storing section 28 stores the temperature increasing time and the temperature decreasing time. Accordingly, the execution time of the reaction process which takes place under temperature control condition may be also calculated.

The synthesizing process is carried out according to the executing order of respective processes set in the synthesizing protocol.

Referring to FIG. 4, the total execution time (tA) of the reaction process may be calculated by adding each process time. The execution time (tp) to execute one reaction cycle is calculated by adding the dispensing time (td), the stirring time (tk), the reaction time (tr), and the discharging time (tc). Further, as shown in FIG. 4, for example, when the stirring time (tk2) and the temperature increasing time are overlapped in the second reaction, the overlapping time (tr2) is subtracted to calculate the total execution time (tA). Further, a part of the total execution time (tA) also may be calculated.

As described above, the execution time calculating section 26 calculates the presumed execution time and the monitor 19 displays the calculated presumed execution time. A printer may print out the calculated execution time.

In this embodiment of the present invention, an operator may designate the scope of the calculation of the execution time by using the keyboard 21 an the mouse 22. For example, referring to FIG. 5, the monitor 19 displays a synthesizing process picture which shows each process of the synthesizing process in an execution order. The operator designates the scope of the calculation of the execution time by, for example, dragging the mouse 22 to designate the intended scope in the synthesizing process picture. Further, while the synthesizing process is carried out, the process which is currently carried out is highlighted in the synthesizing process picture so that the operator may learn which process is currently carried out. Further, the monitor displays the execution time of all or a part of the synthesizing process while the synthesizing process is carried out.

The control unit of the embodiment described above comprises a personal computer in which software is installed. Data storages such as the protocol storing section 24, the operating condition storing section 27, the apparatus status storing section 28 and the like are provided in volatile memories in the personal computer or external storages. Processing and controlling portions, such as the image display control section 23, the synthesizing process execution controlling section 25, the execution time calculating section 26 and the like are provided in a CPU in the personal computer. When the execution time is calculated while the synthesizing process is carried out, the execution time is calculated during idle periods of the CPU, i.e., periods during which the CPU does not perform specific tasks. When the load on the CPU becomes too heavy, however, a plurality of CPUs or personal computers may be provided.

Next, the operation of the synthesizer will be explained. In order to carry out the synthesizing process, an operator sets a synthesizing protocol for carrying out the synthesizing process in the synthesizer.

In order to display the execution time before the synthesizing process is carried out, the operator designates the scope of the calculation of the execution time by using the keyboard 21 an the mouse 22. Accordingly, the monitor 19 displays the execution time which is calculated by the execution time calculating section 26.

For example, in order to display the completing time at which the synthesizing process is complete, the operator designates the entire synthesizing process as the predetermined scope of the synthesizing process, i.e., scope of the calculation of the execution time. If the operator knows the completing time, he may determines the starting time of the synthesizing process in order to complete the synthesizing process at his desired time. If the operator wants to know the starting time of a certain important reaction of the synthesizing process, the operator commands to calculate the executing time from the beginning of the synthesizing process to a process immediately before the important reaction. Further, the execution time calculating section 26 may calculate the executing time from one process to another process before the synthesizing process starts.

Further, the execution time calculating section 26 may calculate the executing time from one process to another process while the synthesizing process is carried out. Accordingly, the operator may know the starting time of a certain important reaction of the synthesizing process while the synthesizing process is carried out.

Figure 6:
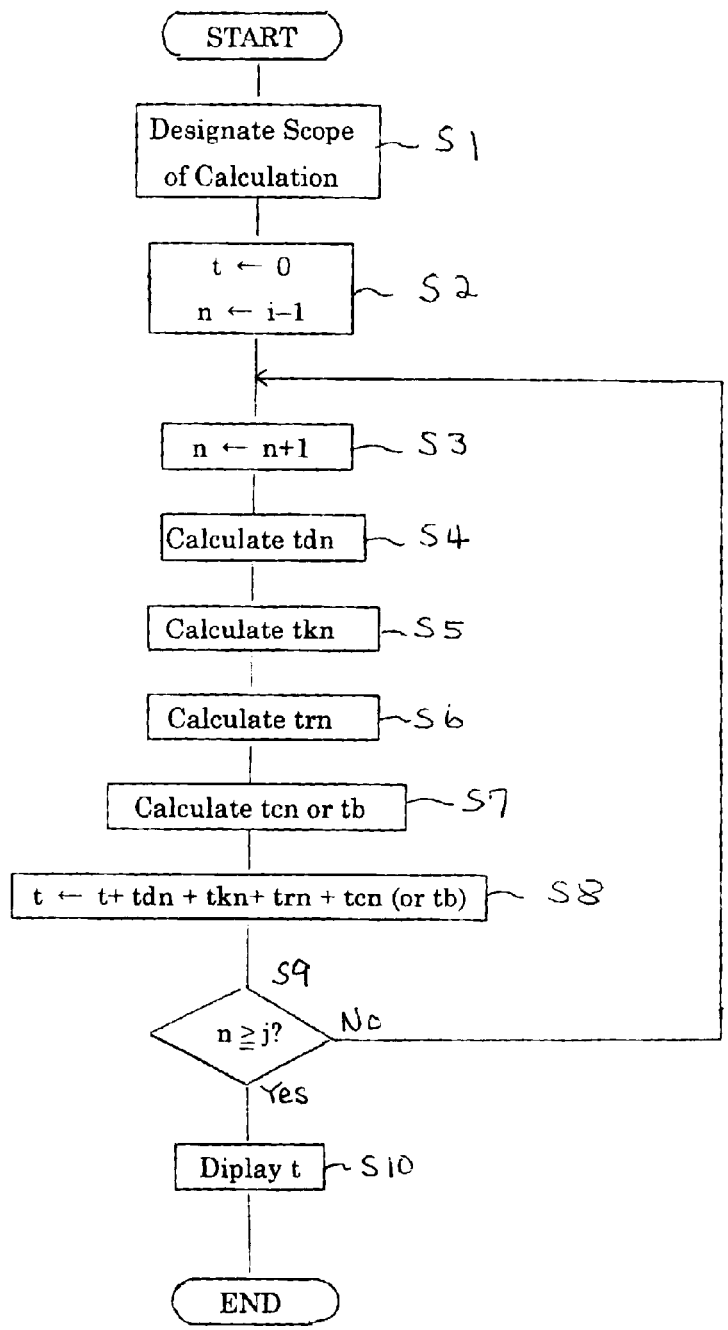
FIG. 6 is a flow chart for calculating the execution time.

FIG. 6 is a flow chart for calculating the execution time. The flow chart shown in FIG. 6 may be carried out before and/or while the synthesizing process is carried out. Referring to FIG. 6, at step (S1), an operator designates the scope of the calculation of the execution time. If a part of the synthesizing process is designated, the operator sets a starting process number (i) and a ending process number (j). If the entire synthesizing process is designated, (i) is set to 1 and (j) is set to the final process number. At step (S2), the execution time (t) is set to zero and a counter (n) is calculated by subtracting 1 from (i). At step (S3), the counter (n) is incremented by 1. The execution time of (n)th process of the synthesizing process is calculated. At step (S4), the dispensing execution time (tdn) of the (n)th process is calculated. At step (S5), the stirring execution time (tkn) of the (n)th process is calculated. At step (S6), the reaction execution time (trn) of the (n)th process is calculated. The reaction execution time (trn) of the (n)th process includes the temperature increasing and decreasing times. When the stirring time (tkn) and the reaction execution time (trn) overlap, the overlapping time is subtracted from the reaction execution time (trn). At step the discharging execution time (tcn) of the (n)th process is calculated. At step (S8), the execution time (t) to execute the (n)th process is calculated. If the (n)th process is the final process including the dispensing and collecting processes, the dispensing execution time (tdn) is calculated at step (S4), and a collecting execution time (tb) is calculated at step (S7). In this process, the stirring execution time (tkn), the reaction execution time (trn) are zero. At step (S8), the execution time (t) is calculated by adding the dispensing execution time (tdn), the stirring execution time (tkn), the reaction execution time (trn), and the discharging execution time (tcn) or the collecting execution time (tb) to the prior calculated execution time. At step (S9), it is determined whether the counter (n) is equal to or larger than (j). If the counter (n) is not equal to or larger than (j), then the routine returns to step (S3) and the execution time of next process will be calculated. If the counter (n) is equal to or larger than (j), the monitor 19 displays the execution time (t) at step (S10).

Figure 7:
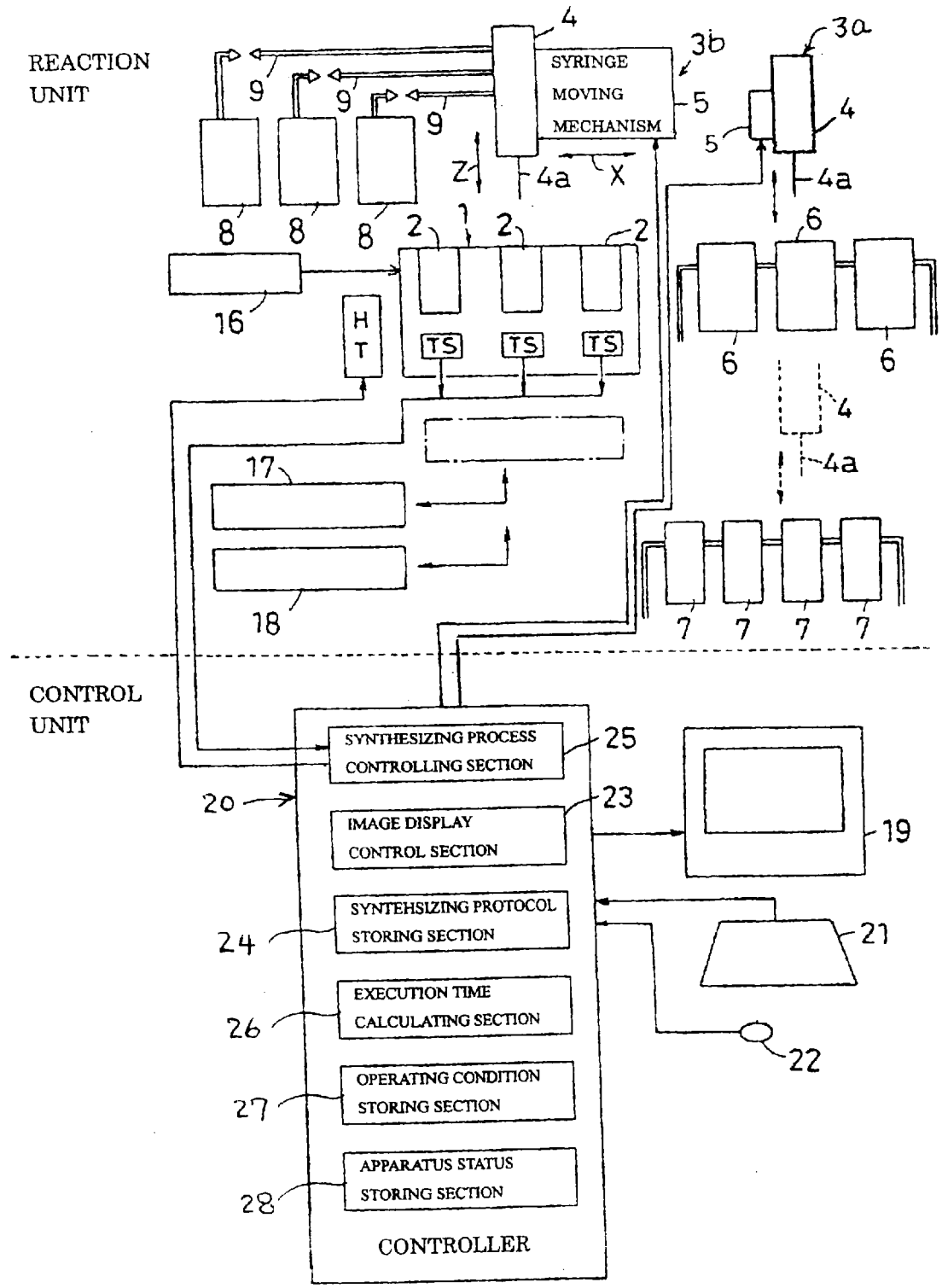
FIG. 7 is a block diagram showing an automated chemical synthesizer for synthesizing compounds according to an embodiment of the present invention.

FIG. 7 shows an automated chemical synthesizer according to an embodiment of the present invention. In the above described embodiment, although the reaction unit of the automated chemical synthesizer includes only one liquid dispenser 3 which dispenses both of the reagents and the solvents to the reaction vessels 2, the reaction unit may have plural liquid dispensers which dispense the reagents and solvents respectively. For example, in the embodiment as shown in FIG. 7, the reaction unit includes a first liquid dispenser (3*a*) which dispenses the reagents to the plural reaction vessels 2, and a second liquid dispenser (3*b*) which dispenses the solvents to the plural reaction vessels 2.

Figure 8:
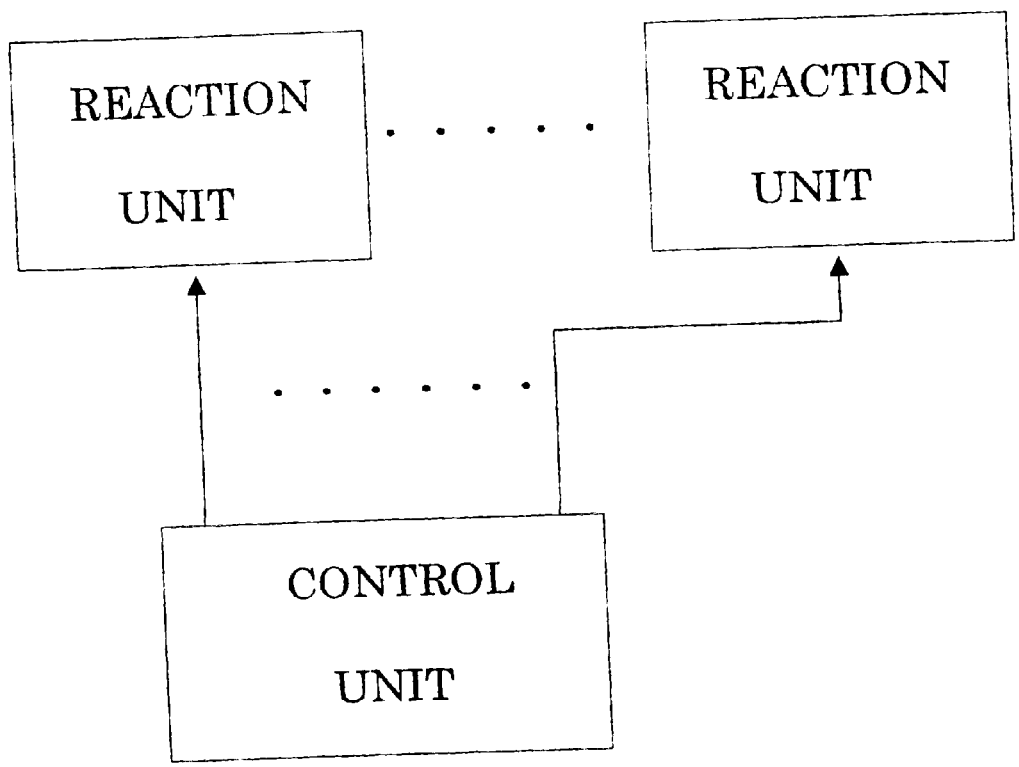
FIG. 8 is a block diagram showing an automated chemical synthesizer for synthesizing compounds according to an embodiment of the present invention.
Figure 9:
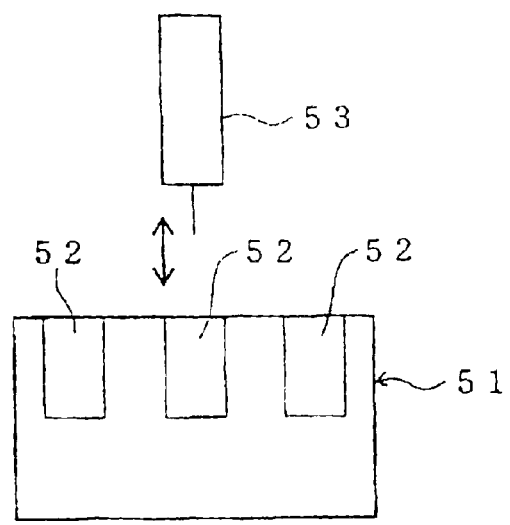
FIG. 9 shows a liquid dispenser and a reaction rack of a conventional automated chemical synthesizer.

FIG. 8 shows an automated chemical synthesizer according to an embodiment of the present invention. As shown in FIG. 8, the control unit may controls two or more reaction units.

The synthesizing process may include other processes which are not explained above. In such a case, the operations of the other processes are analyzed in order to calculate the execution time. The operating condition storing section 27 and the apparatus status storing section 28 stores information necessary for calculating the execution time.

The execution time calculating section may calculate a part of the dispensing process, the stirring process, the reaction process, the discharging process, the collecting process or the like.

An operator may designates the scope of the calculation of the execution time, or the synthesizer may automatically calculate the predetermined scope of the calculation of the execution time, for example, the entire synthesizing process. Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. An automated chemical synthesizer comprising:
  a plurality of reaction vessels in which synthetic reactions are to be carried out according to a synthesizing process;
  at least one liquid dispenser configured to dispense liquid chemicals to a selected reaction vessel among said plurality of reaction vessels;
  a distance finding device configured to find a distance between a position of the at least one liquid dispenser and a position of the selected reaction vessel;
  a moving time calculator configured to calculate moving time to move the at least one liquid dispenser to the selected reaction vessel; and
  an execution time calculator configured to calculate presumed execution time to carry out a predetermined scope of the synthesizing process using the moving time before said predetermined scope of the synthesizing process is actually carried out.

2. An automated chemical synthesizer according to claim 1, wherein said predetermined scope is an entirety of the synthesizing process.

3. An automated chemical synthesizer according to claim 1, wherein said predetermined scope is a part of the synthesizing process.

4. An automated chemical synthesizer according to claim 1, wherein the execution time calculator is configured to calculate the presumed execution time before the synthesizing process starts.

5. An automated chemical synthesizer according to claim 3, wherein the execution time calculator is configured to calculate the presumed execution time while the synthesizing process other than the part of the synthesizing process is carried out.

6. An automated chemical synthesizer according to claim 1, wherein the execution time calculator is configured to calculate the presumed execution time before and while the synthesizing process is carried out.

7. An automated chemical synthesizer according to claim 1, further comprising:
  an output device configured to output the presumed execution time calculated by the execution time calculator.

8. An automated chemical synthesizer according to claim 1, wherein the synthesizing process includes a plurality of processes and wherein the execution time calculator is configured to calculate the execution time by adding a partial execution time to carry out each of the plurality of processes.

9. An automated chemical synthesizer according to claim 8, wherein the execution time calculator is configured to calculate the partial execution time to carry out a dispensing process by adding times during which the liquid dispenser draws the liquid chemicals, moves, and injects the liquid chemicals from the liquid dispenser.

10. An automated chemical synthesizer according to claim 9, further comprising:
  a storage configured to memorize positions at which the liquid chemicals are positioned, kinds of liquid chemicals, a drawing speed at which the liquid dispenser draws the liquid chemicals, and an injecting speed at which the liquid dispenser injects the liquid chemicals.

11. An automated chemical synthesizer according to claim 9, wherein said at least one liquid dispenser is configured to dispense the solvents and reagents to said plural reaction vessels.

12. An automated chemical synthesizer according to claim 11, wherein said at least one liquid dispenser comprises:
  a first liquid dispenser configured to dispense the reagents to said plural reaction vessels; and
  a second liquid dispenser configured to dispense the solvents to said plural reaction vessels.

13. An automated chemical synthesizer according to claim 8, wherein the plurality of processes include a reaction process, the execution time calculator being configured to calculate the partial execution time to carry out the reaction process based on a predetermined reaction time.

14. An automated chemical synthesizer according to claim 13, further comprising:
  a temperature controlling mechanism configured to control temperature of each of the plurality of reaction vessels to be a target temperature; and
  a storage configured to memorize information with respect to a temperature increasing time during which the temperature increases to the target temperature and a temperature decreasing time during which the temperature decreases to a room temperature.

15. An automated chemical synthesizer according to claim 14, wherein the storage is configured to memorize the relationship between the target temperature and the temperature increasing and decreasing time.

16. An automated chemical synthesizer according to claim 8, wherein the plurality of processes include a stirring process, the execution time calculator being configured to calculate the partial execution time to carry out the stirring process based on a predetermined stirring time.

17. An automated chemical synthesizer comprising:
  a plurality of reaction vessels in which synthetic reactions are to be carried out according to a synthesizing process;
  at least one liquid dispensing means for dispensing liquid chemicals to a selected reaction vessel among said plurality of reaction vessels;
  distance finding means for finding a distance between a position of the at least one liquid dispenser and a position of the selected reaction vessel;
  moving time calculating means for calculating moving time to move the at least one liquid dispenser to the selected reaction vessel; and
  an execution time calculating means for calculating presumed execution time to carry out a predetermined scope of the synthesizing process using the moving time before said predetermined scope of the synthesizing process is actually carried out.

* * * * *